US008577199B2

(12) United States Patent
Pierce et al.

(10) Patent No.: US 8,577,199 B2
(45) Date of Patent: Nov. 5, 2013

(54) HAULING SHROUD FOR HAULING FIBRE OPTIC CABLE ALONG A CONDUIT

(75) Inventors: Andrew Eliot Pierce, Cherry Brook (AU); Alexander Mennie, Seaforth (AU); Andrew Kaczmarski, Casula (AU); Kyle Bolto, Kearns (AU)

(73) Assignee: Prysmian Telecom Cables & Systems Australia PTY Ltd, Liverpool, New South Wales (AU)

( * ) Notice: Subject to any disclaimer, the term of this patent is extended or adjusted under 35 U.S.C. 154(b) by 886 days.

(21) Appl. No.: 12/311,283

(22) PCT Filed: Sep. 26, 2006

(86) PCT No.: PCT/AU2006/001403
§ 371 (c)(1),
(2), (4) Date: Mar. 29, 2010

(87) PCT Pub. No.: WO2008/036994
PCT Pub. Date: Apr. 3, 2008

(65) Prior Publication Data
US 2010/0202748 A1    Aug. 12, 2010

(51) Int. Cl.
*G02B 6/00* (2006.01)

(52) U.S. Cl.
USPC .......................................... 385/136

(58) Field of Classification Search
USPC .......................................... 385/136
See application file for complete search history.

(56) References Cited

U.S. PATENT DOCUMENTS

| | | |
|---|---|---|
| 4,460,159 A | 7/1984 | Charlebois et al. |
| 4,684,211 A | 8/1987 | Weber et al. |
| 5,013,125 A | 5/1991 | Nilsson et al. |
| 5,039,196 A | 8/1991 | Nilsson |
| 5,129,027 A | 7/1992 | Boero et al. |

(Continued)

FOREIGN PATENT DOCUMENTS

| | | |
|---|---|---|
| WO | WO 00/75704 A1 | 12/2000 |
| WO | WO 2006/021055 A1 | 3/2006 |

OTHER PUBLICATIONS

Extended European Search Report issued in corresponding European Application No. EP 06 79 0274, including Supplementary European Search Report, Annex to the European Search Report and European Search Opinion, mailed Dec. 5, 2011 (11 pages).

(Continued)

*Primary Examiner* — Uyen Chau N Le
*Assistant Examiner* — Hoang Tran
(74) *Attorney, Agent, or Firm* — Finnegan, Henderson, Farabow, Garrett & Dunner, L.L.P.

(57) ABSTRACT

A hauling shroud, a cable termination and methods of hauling a fiber optic cable with a pre-connected optic termination along a conduit. The hauling shroud protects the optic termination when being hauled along the conduit. The hauling shroud includes a first housing member and a second housing member such that the first housing member and the second housing member can be joined together to enclose the optic termination. At least one anchoring member is used, for example, connecting pins, such that at least one strengthening element of the fiber optic cable engages with the anchoring member inside an internal cavity formed within the hauling shroud. Alternatively, at least two strengthening elements of the fiber optic cable are attached together to form a loop which engages with the at least one anchoring member, e.g., the connecting pins. This prevents any hauling forces from being applied to the optic termination.

42 Claims, 12 Drawing Sheets

(56) References Cited

U.S. PATENT DOCUMENTS

| | | | | |
|---|---|---|---|---|
| 5,807,026 A | * | 9/1998 | Valette | 405/158 |
| 5,863,083 A | | 1/1999 | Giebel et al. | |
| 5,938,181 A | * | 8/1999 | Holden | 254/134.3 FT |
| 6,396,993 B1 | | 5/2002 | Giebel et al. | |
| 6,461,071 B1 | | 10/2002 | Kanemura | |
| 6,605,783 B1 | * | 8/2003 | Reed | 174/120 R |
| 6,644,865 B2 | * | 11/2003 | Chang et al. | 385/86 |
| 6,695,491 B1 | | 2/2004 | Leeman et al. | |

OTHER PUBLICATIONS

Furukawa Electric Co Ltd; "Connection Structure of Optical Fiber Cables, Has Strength-Member Connection Part to Which Strength Members of Two Optical Fiber Cables Are Connected, and Core-Wire Connection Part to Which Core Wires of Optical Fiber Cables Are Connected", Derwent Abstract Accession No. 2005-502233/51, V07, JP 2005-195784 A, 2 sheets, (2005).

* cited by examiner

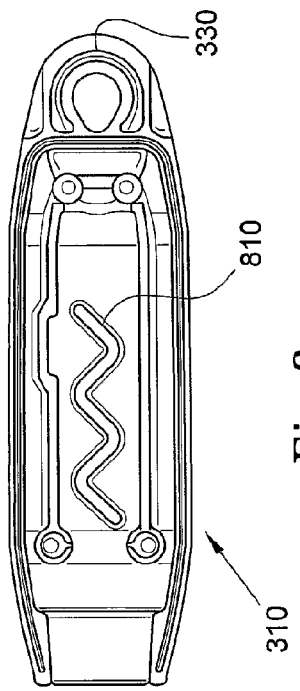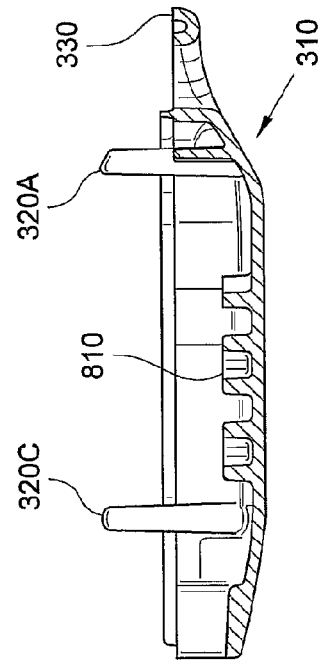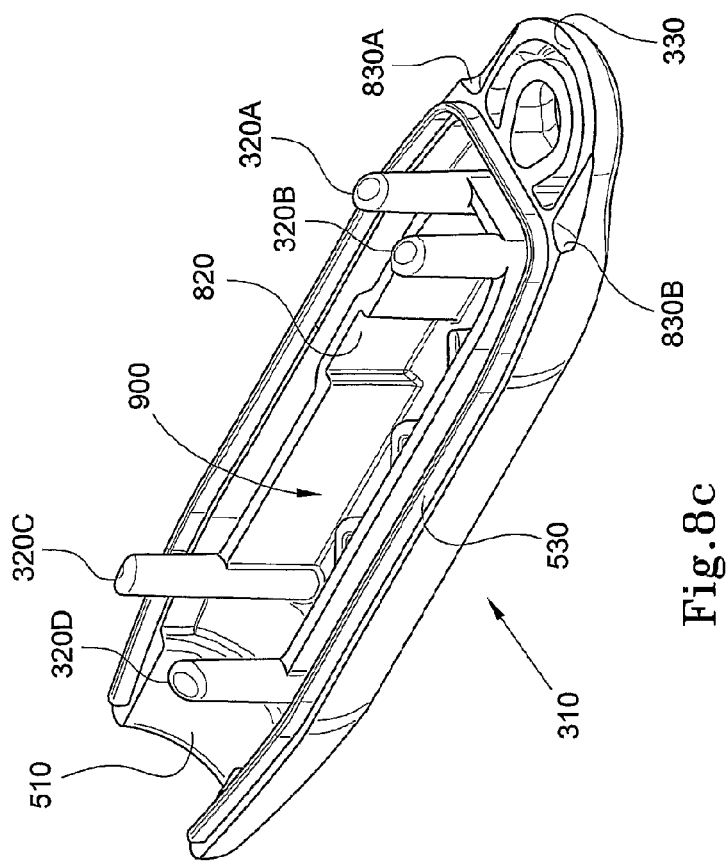

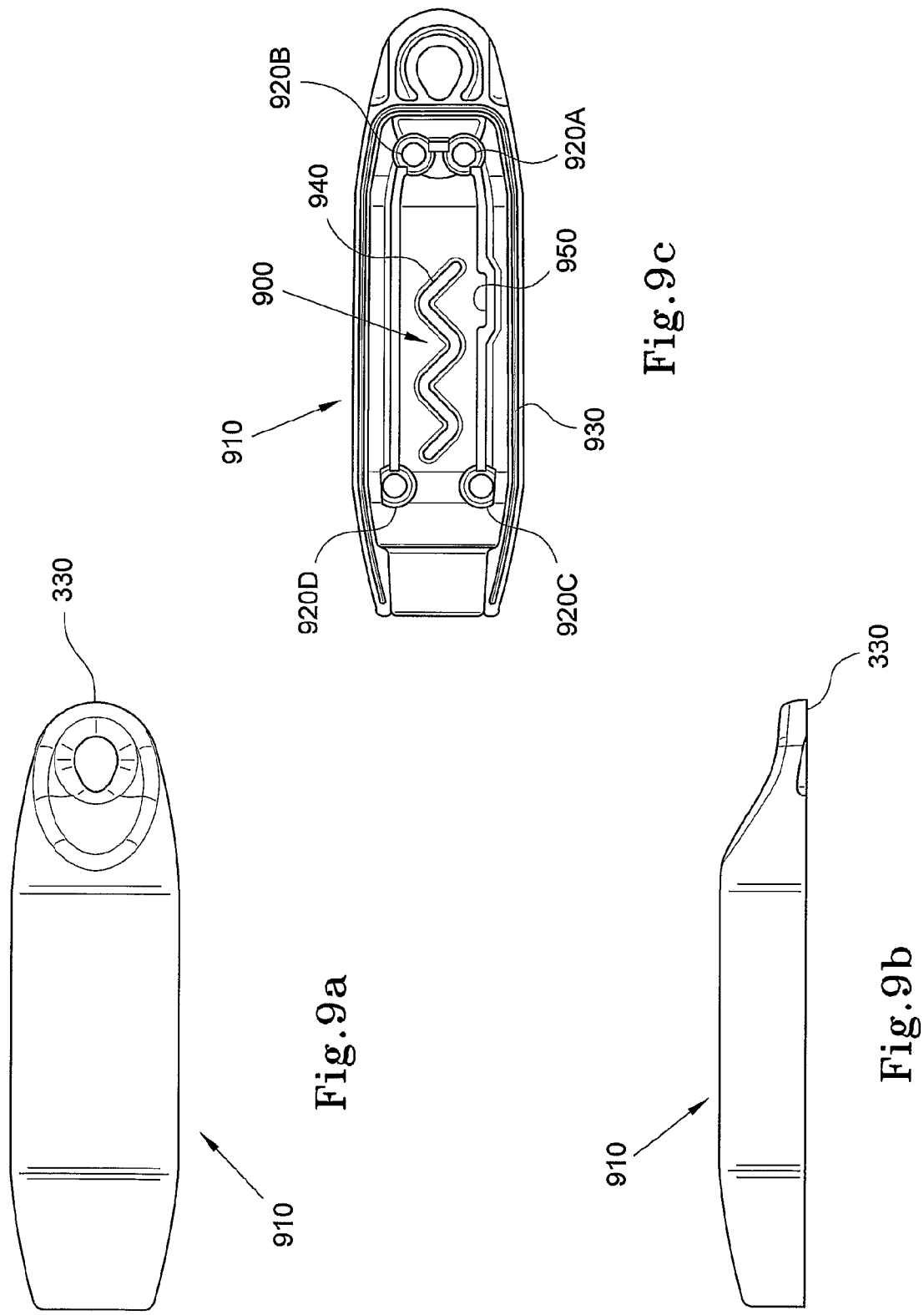

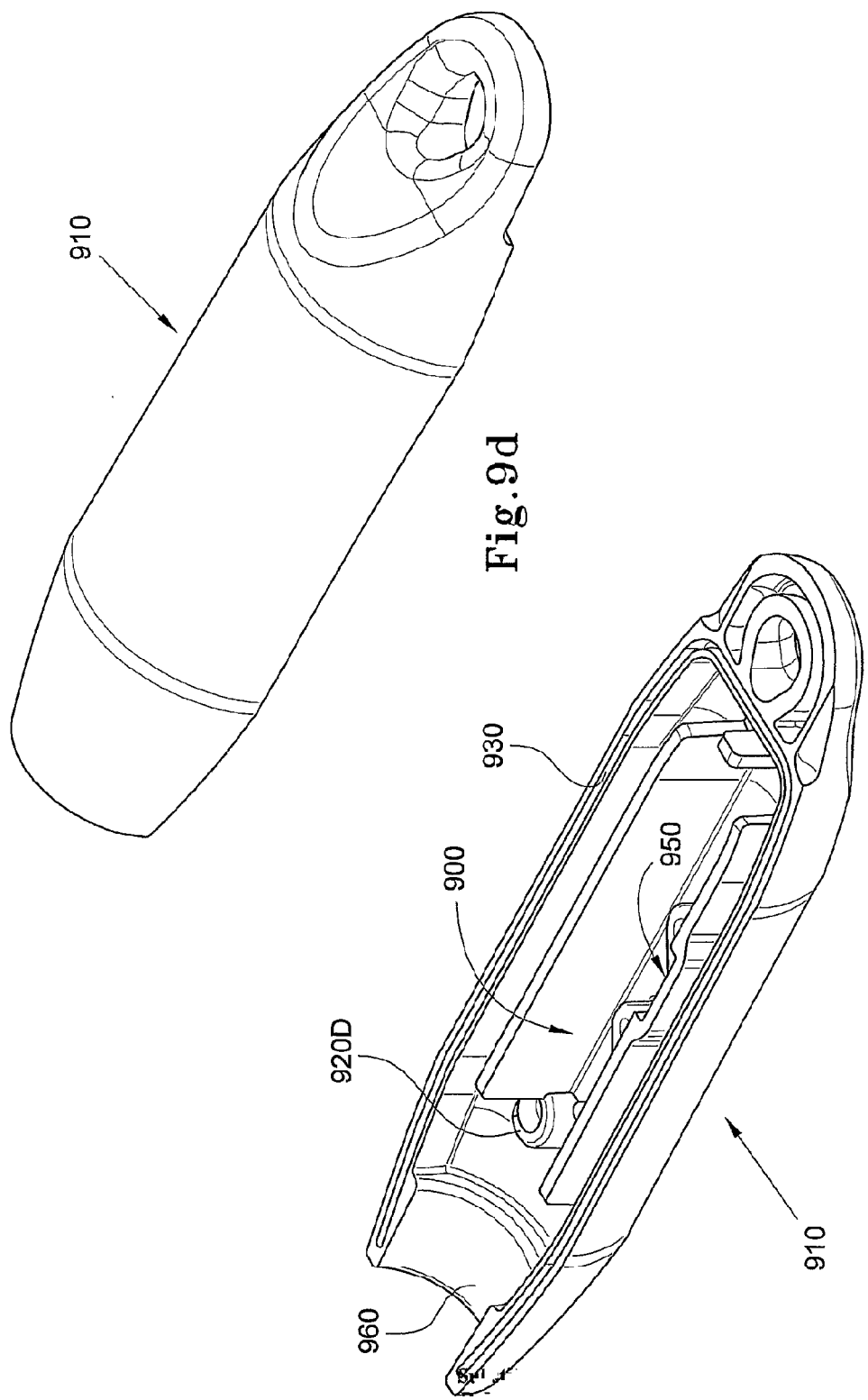

HAULING SHROUD FOR HAULING FIBRE OPTIC CABLE ALONG A CONDUIT

CROSS REFERENCE TO RELATED APPLICATION

This application is a national phase application based on PCT/AU2006/001403, filed Sep. 26, 2006, the content of which is incorporated herein by reference.

TECHNICAL FIELD

The present invention relates to hauling or pulling a fibre optic cable along a conduit, pipe or the like, and in particular, to a hauling shroud, cable termination and methods for allowing the hauling or pulling of a fibre optic cable along the conduit, pipe or the like, said cable being provided with a pre-connected optic connector.

BACKGROUND ART

Traditionally, in a telecommunications network, users' or customers' premises are connected to a Public Switched Telephone Network (PSTN) by a lead-in cable consisting of either one or two pairs of copper conductors (wires). The lead-in cable is routed to a dwelling or other premises either aerially, in the case of an aerial Customer Access Network (CAN), or underground for the more recently deployed underground CANs.

Generally, new estates and residential developments now deploy cable underground. The cable is routed from a distribution point near a property boundary via a small plastic conduit to an entry point to a dwelling. The entry point is typically located at a convenient position, such as close to the electrical cable entry (meter box) or at some other point where access to the building is relatively straightforward.

The lead-in cable is generally pulled through the conduit, which has, for example, an internal diameter of about 20 mm, by means of a thin cord. The cord is threaded through the conduit by first pushing a rigid rod through a length of conduit, e.g. 4.5 m long, (rodding process) with the rope attached at one end. Having performed the rodding process it is then a simple matter to tie the rope to the end of the lead-in cable by means of a knot and then use the rope to haul the cable into and through the conduit. Most often the conduit does not form a completely straight line, but typically undulates and bends with a number of bend elements often being permitted with a radius of curvature generally down to about 100 mm.

There is an emerging need to replace copper conductor lead-in cable with fibre optic lead-in cable to provide users or customers with a range of new or improved services, such as Video on Demand (VoD), high speed Internet access, as well as telephone services over a single integrated network.

In the case of copper lead-in cable, the connection to the customer's equipment, whether the equipment is a standard telephone or a Digital Subscriber Line (DSL) modem, is straightforward and easily accomplished in the field with simple hand tools. The process may involve fitting a connector with screw terminals or, more likely, fitting a connector that can be secured by means of a simple hand operated crimping tool similar to a pair of pliers.

With the move to fibre optic systems the whole process becomes potentially far more complicated. While the fibre optic cable, and in particular the fibre, is very flexible, the fibre optic cable cannot be tied to a hauling rope without fracturing the fibre or, at best, severely affecting the fibre's transmission characteristics. The connection to the Optical Network Unit (ONT) that effectively forms the interface from the new generation PSTN and the customer's equipment requires a fibre to fibre connection to be made.

The fibre used in these systems is typically single-mode. Typically, the single-mode fibre has a mode field diameter (the part of the fibre that carries the signal) of about 9 microns. To obtain a good and reliable transmission it is necessary to butt two fibres together with sufficient precision such that the two extremely small mode fields align exactly. This process is typically accomplished in one of two ways. A direct fusion splice may be used whereby the two fibre ends are mounted in a complicated, high precision, fusion splicing machine that, using an electric arc, melts the two fibre end faces and fuses them together as one. Alternatively, an optical connector can be mounted on the end of each fibre and simply plugged together. Based on presently known technology, it is expensive and complicated to fit a connector to a fibre optic cable in the field since the mating components of the connector have to be machined after fitting to the fibre to ensure perfect alignment. Furthermore, the end face of the connector has to be polished to minimise losses.

Some forms of cable hauling attachments are presently known in the art.

Document WO 2006/021055, in the name of the present Applicant, discloses a hauling shroud for hauling a fibre optic cable along a conduit. The hauling shroud disclosed in said document includes a cavity to receive an optic connector. Moreover, the hauling shroud is provided with a locking mechanism which is obtained by the combination of a recess in the hauling shroud housing and a crimp lug to be received into the hauling shroud housing, the crimp lug being held in place by a retaining sleeve which is in threaded engagement with a retaining thread. The crimp lug is attached to at least one strengthening element, thereby removably holding the strengthening element, and thus the cable, to the hauling shroud. Therefore, the strengthening element is locked to the shroud body and retained in or by the locking mechanism. Furthermore, document WO 2006/021055 discloses an embodiment where the connector is part of a modular connector, for example a connector having a central body (ferrule) to which the optic fibre is fitted and is enclosed in the hauling shroud. An outer part of the connector then links with a mating part on the central body when it is to be optically joined.

Document U.S. Pat. No. 5,863,083 discloses a pulling grip which includes an elongated, flexible pulling grip housing for use in installing fibre optic cable and, more particularly, for installing a fibre optic cable which contains a number of pre-connectorized optical fibres. The pulling grip housing includes first and second portions which mate to form the pulling grip housing and which open to provide access to an internal cavity for placement of the pre-connectorized optical fibres of the fibre optic cable. The pulling grip housing can secure the connectors within the internal cavity to prevent undesirable tangling of the optical fibres during installation. For example, the pulling grip housing can include an adhesive surface or a number of slots for retaining respective ones of the connectors. The pulling grip is also connected to an end portion of the fibre optic cable and, more particularly, a strength element of the fibre optic cable such that forces imparted during the advancement of the pulling grip housing through a conduit are transferred to the strength element of the fibre optic cable and do not place undesirable strain on the optical fibres. The pulling grip housing therefore protects the optical fibres and the respective connectors from damage during installation while permitting pre-connectorized fibre optic cables to be installed regardless of the leg lengths of the optical fibres.

Document U.S. Pat. No. 5,129,027 discloses a drawing head for ribbon type optical cables equipped with respective end connectors. The drawing head comprises a drawing member connected at one end thereof to the axial strength member of the cable and at the other end thereof to a pulling grasping member, the drawing member being surrounded by a slotted body which has a length corresponding to a predetermined excess value of the fibre ribbon length and being provided with grooves adapted to accommodate the fibre ribbons disposed in alignment with the grooves of the slotted cable core. The slotted body is followed by a deformable support body which surrounds the drawing member and is provided with longitudinally separated and aligned housings which are designed to receive the end connectors of the ribbons. An aramid cable layer is locked between two sleeves possessed by the drawing head so that the pulling loads applied to the cable are distributed among the outer sheath, aramid layer and axial strength member of the optical cable.

Document U.S. Pat. No. 5,039,196 discloses a device for pulling optical fibre cables through cable ducts. Referring to FIG. 1a, an optical fibre cable 10 used with a pulling eye has a plurality of radial strength yarn threads 16 and steel armour layer 18. There is also provided diametrically opposed strength members 24. In a first embodiment, cable strength members 24 are slid by a user through the open end of the cable crimping sleeve portion 30 and into the longitudinally directed cavities 33 to be gripped via set-screws 34. In a second embodiment, two collets 52 (see FIG. 8) are designed to grip cable strength members 24. The use of the pulling eye assembly allows a multiple strength member cable to be pulled through cable ducts while protecting the fibres in the cable.

Document U.S. Pat. No. 5,013,125 discloses a pulling assembly for connectorized optical fibre cables. The pulling assembly is formed of a flexible metal braided hose portion for conveying a pulling force to said cable and for providing a chamber in which the cable connectors may be housed during a cable pulling operation. A cylindrical housing is attached to one end of said braided metal hose and includes a concentrically-arranged central strength member gripping apparatus and a buffer tube alignment structure disposed about the central strength member gripping apparatus. A crimping sleeve is attached to an opposite end of said cylindrical housing fixing said concentric arrangement within the cylindrical housing and being crimpably engageable with an outer surface of an optical fibre cable.

Document U.S. Pat. No. 4,684,211 discloses a device for pulling a fibre optic cable through ducts and conduits. Said device comprises an elongated housing having a closed forward end, an open rearward end, and a central bore extending longitudinally there through for reception of a pre-terminated fibre optic cable including one or more ferrules terminated in corresponding ferrules which rest within the housing, the forward end being provided with grasping means, and the rearward end being adapted for mounting to a tensile load-bearing portion of the terminated end of the fibre optic cable. In a preferred embodiment, the rearward end is provided with threads for threaded engagement with a receptor nut mounted on the strain relief of a terminated fibre optic cable.

Document U.S. Pat. No. 5,807,026 discloses an assembly for pulling the end of a cable. Said assembly includes a hollow anchoring body having an axial passage formed in a front end thereof for receiving an end of the cable. The anchoring body has an integral hollow cylindrical skirt coaxially extending rearwardly, the skirt receiving an axially positioned insulating ring and a clamping assembly that is located radially inwardly of the ring. The clamping assembly has three sections: (a) a hollow sleeve having an internal thread at a rear end thereof and a tapered shoulder at a front end thereof; (b) a clamping member received in the tapered shoulder of the sleeve; (c) a fastener screwed into the internal thread and abutting the clamping member; and (d) a head formed on the fastener to permit it to be screwed into the thread and apply axial pressure to the clamping member thereby forcing the clamping member to clamp the covering of an optical module of the cable. A removable hollow pulling cover axially abuts the anchoring body and covers the cylindrical skirt. A terminal plate located at an end of the hollow casing, opposite the cylindrical skirt, connects stripped fibres thereto. The anchoring body comprises a front part in which are provided holes which are suitable for receiving locking screws for the metal wires of the cable outer sheathing.

The Applicant has faced the problem of providing a hauling shroud as well as a cable termination and methods of hauling a cable along a conduit which can eliminate, or at least remarkably reduce, the problems that arise in seeking to deploy a fibre optic lead-in cable by using the known technology mentioned above. Principally, these problems include:

(i) Presently known optical lead-in cables do not lend themselves to traditional installation methods since they cannot be hauled in the conventional way.
(ii) Connection of the optical lead-in cable to the ONT is relatively complicated.
(iii) The use of fusion splicing to connect to the ONT requires highly trained operators with complicated and expensive equipment that is not easily portable to the various locations where the splice is required.
(iv) It is not easily possible to fit optical connectors with the required level of performance in the field.
(v) The conduit from the distribution point to a customer's premises is small, often being about 20 mm in diameter, and the conduit is not straight in most installations.
(vi) The development of a new estate is typically ad hoc in that, once the sub-divisions are approved, the infrastructure services are then installed. This typically means that electricity, water, gas and telecommunications services are pre-installed along the streets. At the time of installation it is required to pre-provision for each customer's requirements. There may then be anything up to perhaps 2-3 years before a customer's dwelling is built. This means that it is therefore necessary to be able to sufficiently protect the fibre optic lead-in cable, and in particular the fibre end with a factory, pre-connected or pre-fitted connector attached, for at least this period of time from water (pits usually become flooded), dirt or other environmental conditions.

In particular, in the case a pre-connectorized fibre optic cable is requested to be hauled along a conduit, in order to avoid that the forces imparted during pulling of the cable negatively affect the optical fibres thereof, the Applicant has noted that the known hauling systems mentioned above transfer said forces to a cable strength member by interposing said strength member between at least two substantially cylindrical elements, thereby providing a concentric multi-layered structure inside of which the cable strength member is arranged.

The Applicant has perceived that such a concentric multi-layered structure contributes in increasing the hauling shroud size in the radial direction, thereby negatively affecting—and sometimes even preventing—a correct and effective pulling of a pre-connectorized cable along a conduit, in particular when the latter has a very small inner diameter (e.g. even lower than 20 mm) and is provided with bends (having a curvature radius even down to about 100 mm) along the longitudinal development thereof.

DISCLOSURE OF INVENTION

The Applicant has found that the overall dimensions of a hauling shroud, which is suitable for receiving a pre-connectorized fibre optic cable thereinto, can be advantageously reduced—in comparison with the overall dimensions of the solutions already known in the art and described herein above—by securing a cable strengthening element directly inside the hauling shroud.

In detail, the Applicant has found that by providing an anchoring member inside the cavity formed within the hauling shroud and by engaging a cable strengthening element with said anchoring member, it is possible to avoid that mechanical constraints are provided in a position radially external to the hauling shroud, the presence of said mechanical constraints negatively contributing in increasing the overall dimensions—in particular the radial dimensions, i.e. the dimensions in the plane perpendicular to the hauling shroud longitudinal axis—of the hauling shroud.

Therefore, according to a first aspect, the present invention relates to a hauling shroud for hauling a fibre optic cable along a conduit, the hauling shroud comprising:
- a longitudinally split, closable housing body having an internal cavity and a grasping element for pulling the fibre optic cable along said conduit;
- at least one anchoring member suitable for engaging with at least one strengthening element of the fibre optic cable, wherein:
- said internal cavity comprises a seat for housing an optic termination, and
- said anchoring member is located within said cavity.

In the present description as well as in the claims attached thereto, the term "optic termination" is used to indicate a mechanical device for aligning and joining together two or more optical fibres, thereby providing a means for attaching to, and decoupling from, a fibre optic installation and/or apparatus. Therefore, in the present description and in the attached claims, the term "optic termination" is used to indicate a ferrule or an optic connector.

The ferrule is a long and thin cylinder that is bored through the centre thereof so as to contain an optical fibre. The ferrule acts as a fibre alignment mechanism and the optical fibre is inserted into the ferrule in such a way that the end of the optical fibre is located in correspondence of the ferrule end portion.

The optic connector comprises a ferrule and a retaining member which is suitable for housing and enclosing the ferrule so that the optic termination is ready to attach to, and decouple from, a fibre optic installation and/or apparatus.

According to the present invention, the housing body comprises a first housing member and a second housing member which engage to form the internal cavity within which the seat for the optic termination and the anchoring member are provided.

According to the present invention, the housing body further comprises a securing element which is suitable for engaging the strengthening element to the anchoring member so that—during hauling of the cable along the conduit—the pulling forces are advantageously applied to the strengthening element and not to the cable optic fibres.

Preferably, the securing element is chosen from the group comprising: a clip; a crimp; a knot; an adhesive; a screw, or a combination thereof.

According to the present invention, the position of the anchoring member is selected from the group of: in front of the seat; behind the seat; and on one or more lateral sides of the seat. In detail, in the case the anchoring member is positioned in front of the seat for the optic termination, this means that the anchoring member is located along the hauling shroud longitudinal axis or possibly distanced from said longitudinal axis, so that—once the optic termination is positioned within the hauling shroud—the anchoring member is located in correspondence of the ferrule possessed by the optic termination. Alternatively, in the case the anchoring member is positioned behind the seat for the optic termination, this means that the anchoring member is located along the hauling shroud longitudinal axis or possibly distanced from said longitudinal axis, so that—once the optic termination is positioned within the hauling shroud—the anchoring member is located opposite to the ferrule possessed by the optic termination, i.e. in correspondence of the connection of the optic termination to the fibre optic cable. Alternatively, in the case the anchoring member is positioned on one or more lateral sides of the seat for the optic termination, this means that the anchoring member is located distanced from the hauling shroud longitudinal axis, so that—once the optic termination is positioned within the hauling shroud—the anchoring member is located in correspondence of the longitudinal sides of the optic termination.

Preferably, the anchoring member is selected from the group of: a pin; a pillar; a catch; a hook, or a combination thereof.

Preferably, the external surface of the hauling shroud of the present invention has a streamlined shape for assisting in hauling the shroud through the conduit.

Preferably, the first housing member and the second housing member are obtained by longitudinally splitting the housing body of the hauling shroud in two shells, said first and second housing members mating together to form the internal cavity of the hauling shroud. Preferably, at least part of the first housing member is attached to at least part of the second housing member by resilient engagement, ultrasonic welding and/or adhesive bonding.

The hauling shroud according to the present invention further comprises a flexible boot which is positioned about the fibre optic cable. Preferably, the first and second housing members of the hauling shroud engage with and partially enclose the flexible boot. Optionally, the flexible boot includes a recess that receives a protrusion internal to the hauling shroud. Preferably, though not necessarily, the flexible boot includes at least one channel to receive at least one stiffening element possessed by the fibre optic cable.

According to a second aspect, the present invention relates to a cable termination for hauling a fibre optic cable along a conduit, the cable termination comprising:
- at least one optic termination connected to a fibre optic cable, and
- a hauling shroud for hauling the fibre optic cable along a conduit, the hauling shroud comprising a longitudinally split, closable housing body provided with a grasping element for pulling the fibre optic cable along said conduit, the housing body defining an internal cavity which comprises a seat for housing the optic termination and which locates at least one anchoring member suitable for engaging with at least one strengthening element of the fibre optic cable.

The present invention allows that an optic termination is connected to the fibre optic cable directly in the factory. This provides the significant benefit that the optic termination is associated to the optical fibre(s) in a controlled environment, where access to the cable is relatively easy and appropriate machinery is available to fit, machine, polish and test the optic termination before the cable assembly is sent out for installation.

Moreover, according to the present invention the hauling shroud can be coupled to and decoupled from a pre-connectorized fibre optic cable by low skilled technical personnel, thereby advantageously decreasing the overall hauling/installation time of the pre-connectorized fibre optic cable.

According to the present description and the claims attached thereto, the term "pre-connectorized fibre optic cable" is used to indicate a fibre optic cable which is provided with a ferrule or, alternatively, with an optic connector as defined above.

Preferably, the cable termination of the present invention comprises an optic connector. In other words, according to a preferred embodiment of the present invention, the hauling shroud is provided with a seat that is suitable for positioning an optic connector, i.e. an assembly comprising a ferrule and a retaining member for housing said ferrule. Therefore, according to this preferred embodiment the cable termination allows that a complete optic connector is housed within the hauling shroud and hauled along a conduit, even though of small internal diameter and provided with bends. According to this preferred embodiment, once the pre-connectorized cable has been hauled along a conduit, the pre-connectorized cable can be connected to an optical device or to a further pre-connectorized cable by simply removing the hauling shroud and engaging the optic connectors, without the need of carrying out any further processing step on the pre-connectorized cable. Therefore, the cable termination according to the present invention allows that the pre-connectorized cable is hauled along conduits of very small dimensions and provided with bends without damage to the connector and, moreover, conferring protection against mechanical stress and environmental factors (principally dirt and moisture) during hauling, storage and handling of the pre-connectorized cable. Furthermore, the system of the present invention also advantageously allows that low skilled technical personnel is employed for the hauling process and the successive step of making the optic network connection.

According to a further embodiment of the present invention, the cable termination comprises an optic termination which consists of a ferrule to be positioned inside the seat provided with the hauling shroud.

According to the cable termination of the present invention, the housing body comprises a first housing member and a second housing member which engage to form the internal cavity within which the seat for the optic termination and the anchoring member are provided.

According to a preferred embodiment of the present invention, the fibre optic cable is provided with at least two strengthening elements which are associated together to form a loop that removably engages with at least one anchoring member of the hauling shroud. According to this solution the pre-connectorized cable can be easily and quickly decoupled from the hauling shroud without requiring that complex and time consuming operations are requested to be performed on the hauling shroud and/or the pre-connectorized cable by skilled technical personnel.

Preferably, said loop is obtained by using a securing element which removably couples together said at least two strengthening elements. Preferably, the securing element is chosen from the group comprising: a clip; a crimp; a knot; an adhesive; a screw, or a combination thereof.

Preferably, the hauling shroud further includes a hauling rope or cable to be associated to the grasping element for pulling the hauling shroud through the conduit.

According to a third aspect, the present invention relates to a method of hauling a pre-connectorized fibre optic cable along a conduit, the method comprising the steps of:
  providing a fibre optic cable with at least one optic termination;
  positioning the optic termination into a seat formed within a housing body of a hauling shroud;
  securing at least one strengthening element of the fibre optic cable within the housing body.

According to the present invention, the step of securing the strengthening element within the housing body comprises the step of engaging said strengthening element with at least one anchoring member provided within an internal cavity of said housing body.

Preferably, the step of engaging said strengthening element with at least one anchoring member comprises clipping the at least one strengthening element to the anchoring member. Alternatively, the step of engaging comprises crimping the strengthening element to the anchoring member. Alternatively, the step of engaging comprises bonding the strengthening element to the anchoring member, e.g. by means of an adhesive. Alternatively, the step of engaging comprises knotting the strengthening element to the anchoring member. Alternatively, the step of engaging comprises screwing the strengthening element to the anchoring member.

According to the present invention, the step of securing the strengthening element within the housing body comprises the step of coupling together at least two strengthening elements of the fibre optic cable so as to form a loop. Moreover, according to this embodiment, the method of the present invention comprises the step of engaging said loop with the anchoring member. Furthermore, according to this embodiment, the step of coupling comprises clipping, crimping, bonding, knotting or screwing together the at least two strengthening elements.

According to the present invention, the method comprises the step of mating a first housing member and a second housing member of said housing body so as to form the hauling shroud and to enclose thereinto the optic termination. Preferably, the step of mating comprises associating at least part of the first housing member to at least part of the second housing member by resilient engagement, ultrasonic welding or adhesive bonding.

The method of the present invention further comprises the step of applying a pulling force to a grasping element of the hauling shroud for hauling the fibre optic cable along the conduit.

The method of the present invention further comprises the step of connecting the optic termination to at least one optic fibre of the fibre optic cable. Furthermore, the step of connecting further comprises the step of aligning the optic termination with at least one optic fibre of said fibre optic cable.

According to a fourth aspect, the present invention relates to a method of hauling a fibre optic cable along a conduit, the method comprising the steps of:
  coupling together at least two strengthening elements of the fibre optic cable so as to form a loop, and
  engaging said loop with at least one anchoring member provided within a hauling shroud suitable for hauling the fibre optic cable along said conduit.

According to the present invention, the step of coupling comprises clipping, crimping, bonding, knotting or screwing together the at least two strengthening elements.

The method of the present invention further comprises the step of providing the fibre optic cable with at least one optic termination.

The method of the present invention further comprises the step of positioning the optic termination into a seat formed within a housing body of said hauling shroud.

BRIEF DESCRIPTION OF FIGURES

The present invention should become apparent from the following description, which is given by way of example only, of some preferred but non-limiting embodiments thereof, described in connection with the accompanying figures.

FIG. 8A illustrates a top view of a first housing member;

FIG. 8B illustrates a cross-sectional side view of the first housing member;

FIG. 8C illustrates a perspective view of the first housing member;

FIG. 9A illustrates an external top view of a second housing member;

FIG. 9B illustrates an external side view of the second housing member;

FIG. 9C illustrates a plan view of the second housing member;

FIG. 9D illustrates an external perspective view of the second housing member;

FIG. 9E illustrates an internal perspective view of the second housing member;

MODES FOR CARRYING OUT THE INVENTION

Figure 1:
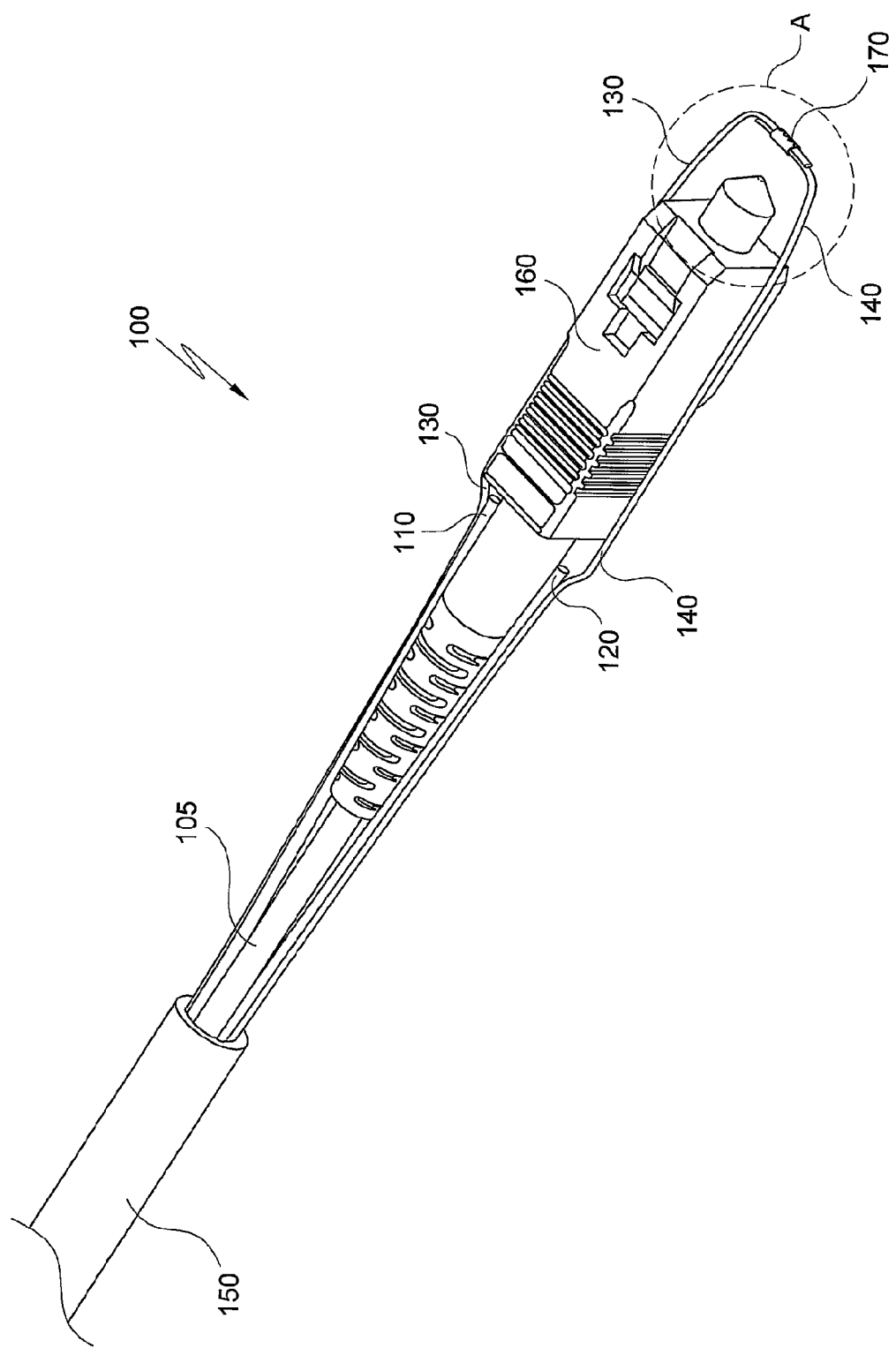
FIG. 1 illustrates a perspective view of a fibre optic cable provided with an optic termination.

The following modes, given by way of example only, are described in order to provide a more precise understanding of the subject matter of the present invention.

In the figures, incorporated to illustrate some features of the embodiments of the present invention, like reference numerals are used to identify like parts throughout the figures.

Fibre Optic Cable:

Referring to FIG. 1, fibre optic cable 100 includes a central jacket 105 which is used for protecting a single optic fibre (not visible in the figures). Typically, the single optic fibre is a single-mode fibre. Alternatively, the optic fibre is a multi-mode fibre. Preferably, a tight acrylate buffered fibre is used; the latter has typically a diameter of, about 245 µm. The central jacket 105 may be made from a, polymeric material, e.g. polyamide, and has a diameter which can be of about 900 µm. Alternatively, reference numeral 105 may refer to the single optic fibre itself in the case a central protective jacket is not provided. Alternatively, the optic cable comprises more than one optic fibre.

Around or adjacent the optic fibre, for example a tight buffered fibre, and central jacket 105 is generally laid one or more stiffening elements, for example a first stiffening element 110 and a second stiffening element 120. Moreover, about or adjacent central jacket 105 is laid one or more strengthening elements so as to obtain a first strengthening element 130 and a second strengthening element 140. Preferably, the strengthening element comprises polymer fibres. More preferably, the strengthening element is made of aramid yarns. Each of the first strengthening element 130 and the second strengthening element 140 may be formed of a number of bunched or grouped aramid yarns. According to the present invention, strengthening elements 130, 140 are used to removably attach to or engage with at least one anchoring member of the hauling shroud. Generally, around strengthening elements 130, 140, fibre optic cable 100 comprises a polymeric layer (e.g. made from PVC or Polyethylene) to form cable outer jacket 150. One or more sheath materials may be used to form outer jacket 150 in order to provide the required level of protection. In a particular embodiment, composite layers of co-extruded polyethylene for durability and polyamide for reduced friction and termite resistance can be suitably used.

The overall diameter of cable 100 is important since space in distribution joints, the pits in which they are housed and the conduits are often very restricted. In the illustrated example an outer diameter of 5 mm has been achieved.

Figure 2:
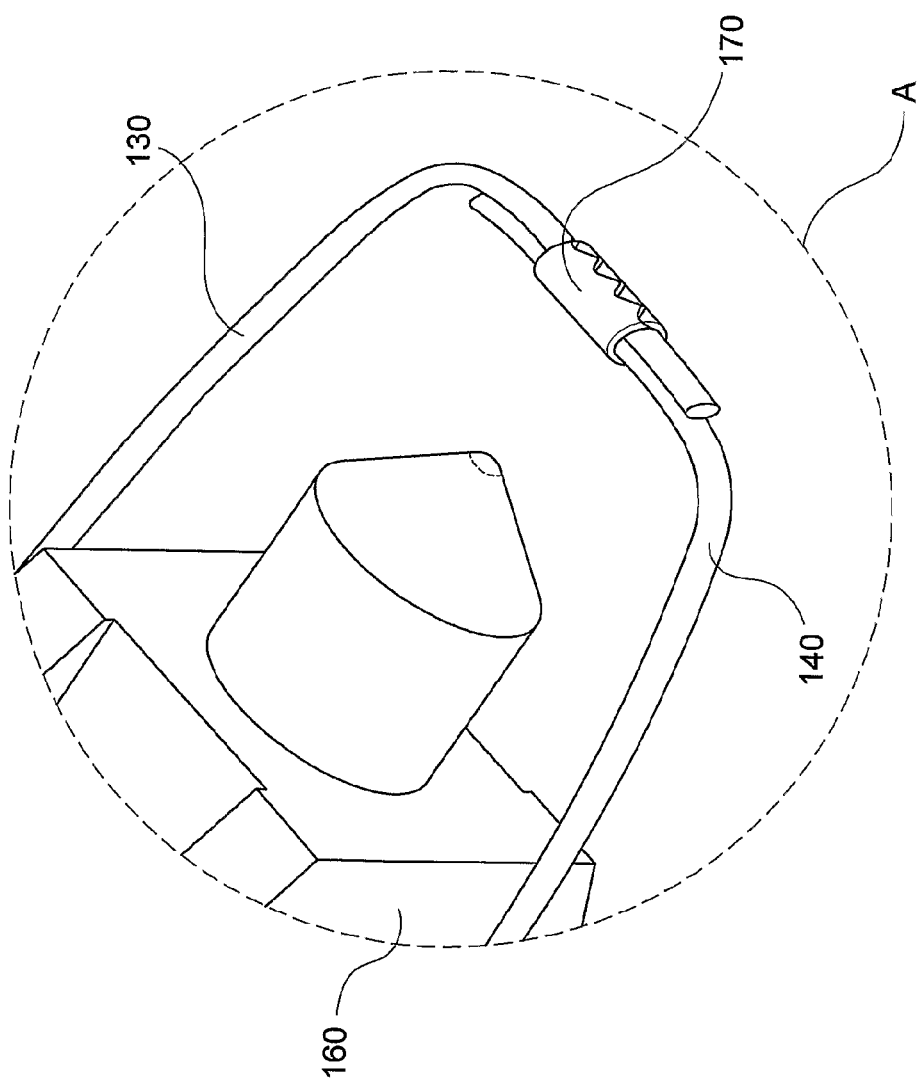
FIG. 2 illustrates a magnified view of the area A shown in FIG. 1.

Referring to FIG. 2, there is illustrated a magnified view of area A illustrated in FIG. 1. FIG. 2 illustrates a preferred embodiment of the present invention according to which first strengthening element 130 and second strengthening element 140 are attached together to form a loop. In details, according to said preferred embodiment of the present invention, first strengthening element 130 and second strengthening element 140 are attached together by means of a securing element (e.g. clip 170) so as to form a loop which is located around the optic termination. Preferably, though not necessarily, the optic termination is an optic connector 160.

In the figures, the optic termination is always shown as an optic connector 160 which includes a ferrule and a retaining member for housing said ferrule, the retaining member allowing the optic termination to connect with a corresponding optic installation (e.g. a further optic connector). Alternatively (said embodiment being not shown in the figures), the optic termination consists only of a ferrule connected to the optic fibre of the fibre optic cable.

The strengthening elements 130, 140 can be attached together by a plurality of securing elements. In FIG. 2 strengthening elements 130, 140 are attached together by using clip 170. Alternative securing elements for attaching strengthening elements 130, 140 (said embodiments being not shown in the figures) can include crimping, tying (e.g. using a knot), fusing (e.g. by heating), gluing by using an adhesive. Alternatively, strengthening elements 130, 140 can be secured together by using a screw, nut or other threaded engagement means, for example by retaining end portions of strengthening elements 130, 140 underneath a head or flange of a screw that engages with part of the hauling shroud.

A hauling shroud is used to transfer the force from a pulling cord, rope or cable (as optic cable 100 is hauled into a conduit, pipe or the like) without transferring any substantial force, preferably no or minimal force, to the optic connector 160, and to provide a readily removable and effective seal to prevent contamination of optic connector 160 until such time as the final optical connection is to be made.

Hauling Shroud

Figure 3:
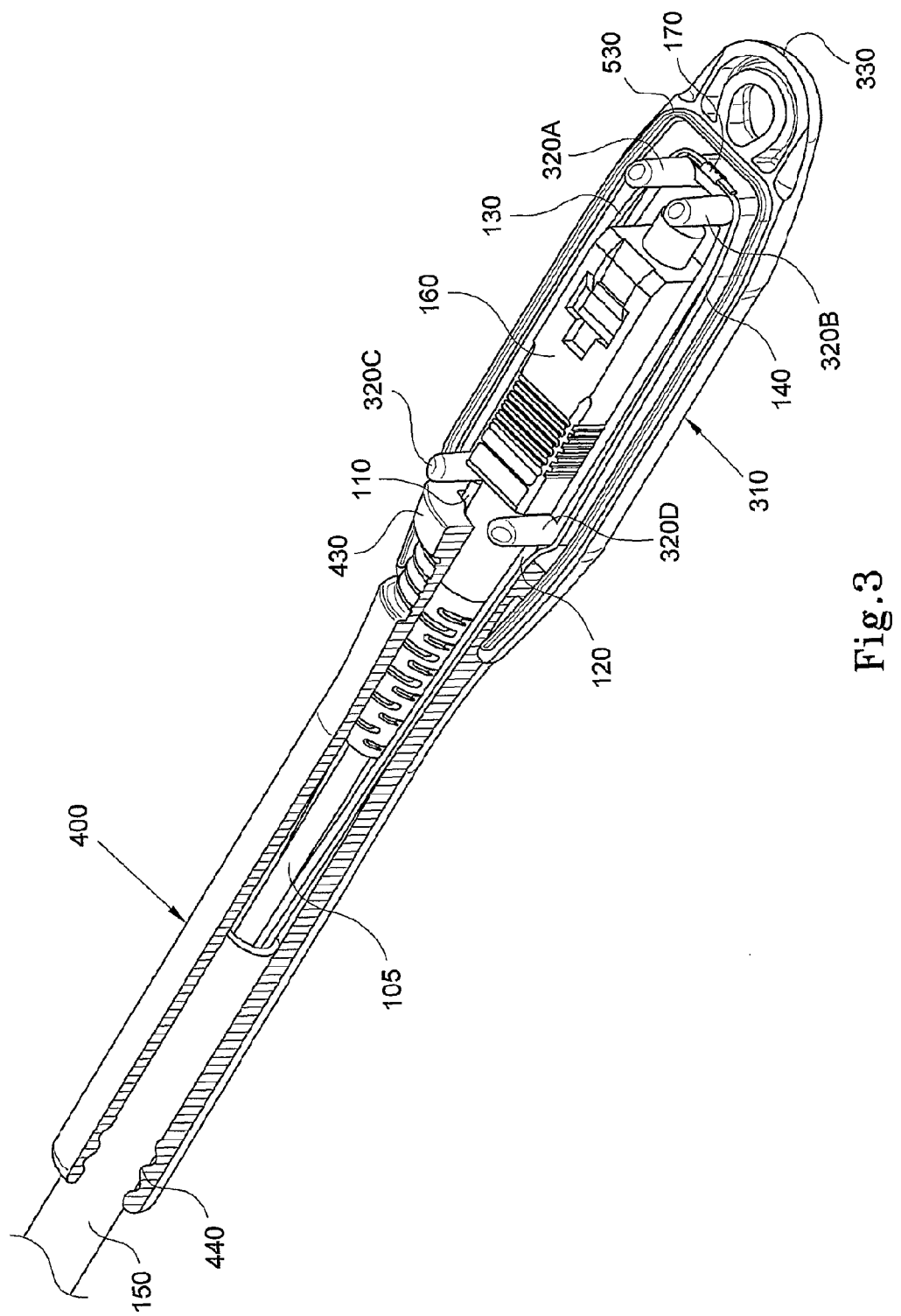
FIG. 3 illustrates a partial cut away perspective view of components of the hauling shroud.

Referring to FIG. 3, there is illustrated part of a hauling shroud according to a preferred embodiment of the present invention, said hauling shroud being suitable for hauling along a conduit the fibre optic cable 100 which is already provided with a pre-connected optic connector 160. The hauling shroud includes a longitudinally split, closable housing body 600 (see, for instance, FIG. 7), said housing body comprising a first housing member 310 and a second housing member 910 (the second housing member is shown in FIGS. 9A-9E). First housing member 310 engages with second housing member 910 to enclose optic connector 160. The hauling shroud includes at least one anchoring member which is provided within the internal cavity possessed by the housing body 600, said cavity being formed by mating the first and second housing members 310, 910. Within said internal cavity—inside of which is positioned said at least one anchoring member—is also formed a seat for locating the optic connector 160. In the preferred embodiment illustrated in FIG. 3, the at least one anchoring member is provided to the first housing member 310 and comprises connecting pins 320A, 320B.

According to the preferred embodiment of the present invention shown in the figures, first strengthening element 130 and second strengthening element 140 are attached together through a securing element, for example a clip 170, to form a loop which engages with the at least one anchoring member, in the illustrated example with connecting pins 320A, 320B. The loop formed by first strengthening element 130 and second strengthening element 140 is simply placed about or around connecting pins 320A, 320B.

It should be noted that a variety of positions of connecting pins 320A, 320B, or other forms of the at least one anchoring member, can be used. In the figures connecting pins 320A, 320B are positioned in front of the seat for optic connector 160. Alternatively, connecting pins 320A, 320B can be positioned on one or more lateral sides of the seat for optic connector 160. This would allow the loop to be placed about connecting pins 320A, 320B but sit on top of optic connector 160.

According to the embodiment shown in FIG. 3, the anchoring member comprises two further connecting pins 320C, 320D. The loop formed by first strengthening element 130 and second strengthening element 140 can be placed about further connecting pins 320C, 320D so as to successively engage with connecting pins 320C, 320D. According to a further embodiment (not shown in the figures) of the present invention, more than one loop can be formed so that, for instance, a first loop engages with connecting pins 320A, 320B and a second loop engages with further connecting pins 320C, 320D. A variety of configurations for attaching one or more loops to one or more connecting pins is possible.

It should also be noted that the at least one anchoring member need not specifically comprise a connecting pin. The at least one anchoring member of the hauling shroud according to the present invention could be some other form of pillar, catch, hook or the like. For example, connecting pins 320A, 320B could be replaced by one or more catches or hooks forming part of first housing member 310. It should also be noted that the at least one anchoring member, for example a catch or a hook, could be provided in addition to connecting pins 320A, 320B, 320C and/or 320D, so that the connecting pins could be utilised for the sole function of assisting to engage first housing member 310 with second housing member 910.

Preferably, connecting pins 320A, 320B, 320C, 320D are integrally formed as part of first housing member 310, for example by injection moulding. However, connecting pins 320A, 320B, 320C, 320D, or other forms of the at least one anchoring member, could be provided as non-integrally formed with first housing member 310, that is, as components that engage with first housing member 310. Also, all forms of the at least one anchoring member could alternatively or additionally be provided as integrally formed with, or otherwise associated with, second housing member 910.

First housing member 310 also preferably includes at least part of a grasping element 330 that is provided with a pulling eyelet to receive a cord, rope or cable for pulling the hauling shroud through a conduit.

Preferably, the hauling shroud is formed of first housing member 310 and second housing member 910 that are obtained by longitudinally splitting the complete hauling shroud into two shells. It should also be noted that grasping element 330 may be entirely formed as part of first housing member 310 or second housing member 910.

Figure 4:
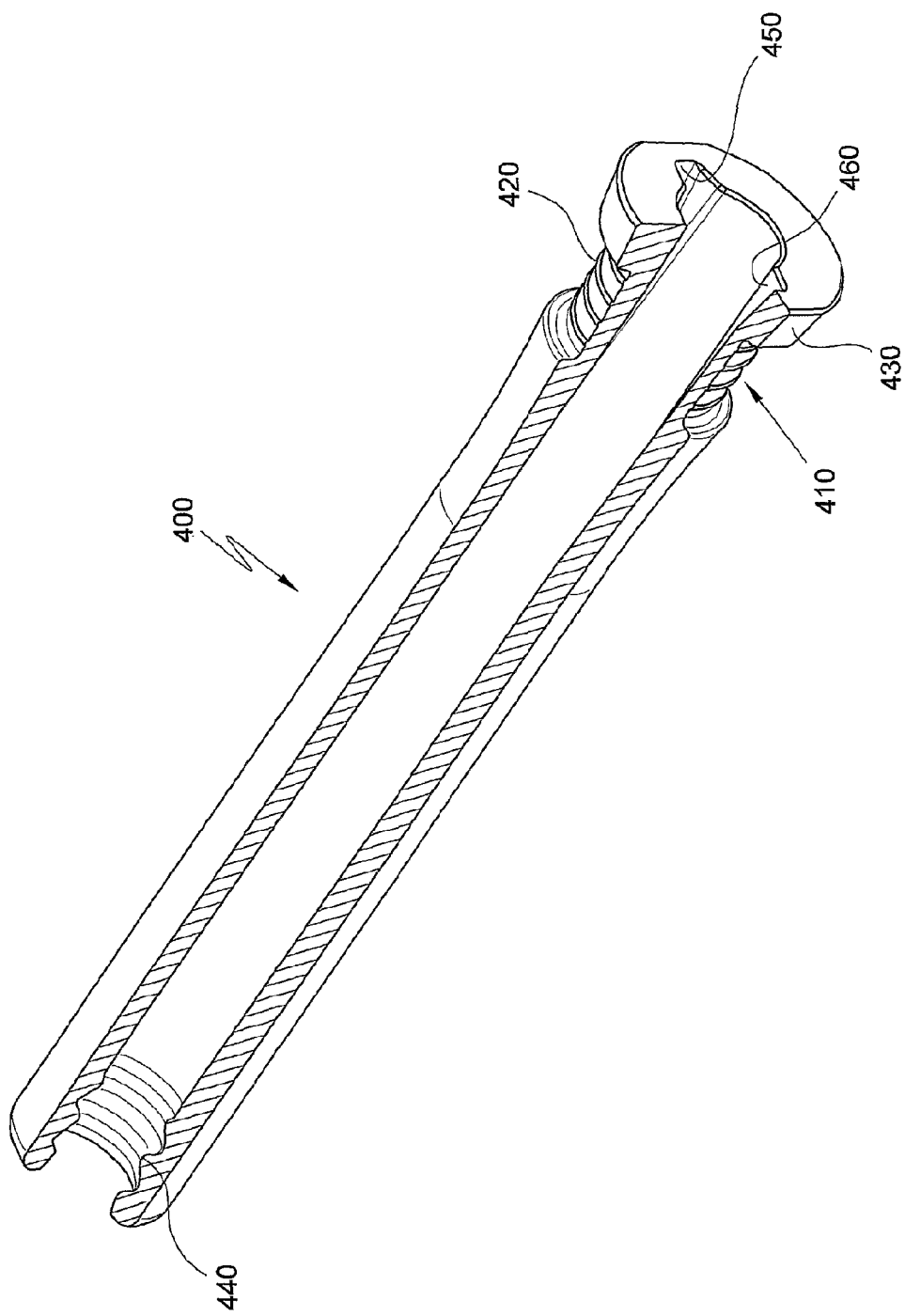
FIG. 4 illustrates a partial cut away perspective view of a flexible boot.

According to the present invention, hauling shroud further comprises a boot 400 which allows the shroud housing members to be mechanically coupled to the optic cable 100. Boot 400 is shown in detail in FIG. 4. Preferably, boot 400 is made of a flexible material in order to advantageously facilitate the hauling of the shroud along the conduit bends. Preferably, boot 400 includes a boot recess 410 that may advantageously include seal ribs 420, the function of which will be described in the following of the present description. Adjacent boot recess 410, boot 400 is further provided with a flanged head 430. Moreover, at the end opposite to flanged head 430, boot 400 is further provided with one or more compression ribs 440. Preferably, the boot inner surface is provided with internal channels 450, 460 which run the entire length of boot 400 or, alternatively, are provided only along a partial length of boot 400.

Seal ribs 420 are compressed by first housing member 310 and second housing member 910 when assembled, for example when assembled in a press machine. As better illustrated in FIG. 5, first housing member 310 preferably includes an annular protrusion 510 which is suitable for engaging with boot recess 410. This assists in providing a secure engagement between first housing member 310 and second housing member 910 when engaged together about boot 400. As disclosed above, preferably the flanged head 430 of boot 400 is enclosed by the shroud housing members 310, 910. Alternatively, even though a less preferred embodiment of the present invention, a boot end portion is designed to at least partially surround a longitudinal end portion of the hauling shroud so that the shroud is partially contained within the boot.

Compression ribs 440 assist to seal boot 400 against outer jacket 150 of fibre optic cable 100. For example, three compression ribs 440 are illustrated in the figures to assist in sealing against an outer jacket 150. As mentioned above, boot 400 is preferably provided with more than one internal channel: in the figures a first channel 450 and a second channel 460 are shown. Preferably, first channel 450 receives stiffening element 110 and second channel 460 receives stiffening element 120. Preferably, stiffening elements 110, 120 are made from GRP (Glass Reinforced Plastic). As shown in FIG. 1, stiffening elements 110, 120 are laid against part of connector 160. First channel 450 and second channel 460 can also be used to guide stiffening elements 110, 120 and strengthening elements 130, 140 during assembly.

Flanged head 430 is also preferably keyed against rotation within first housing member 310 and second housing member 910 when joined. Corresponding flat or planar regions on respective internal surfaces of first housing member 310 and second housing member 910 can abut against keyed or flattened sections of flanged head 430 to prevent rotation of boot 400 relative to first housing member 310 and second housing member 910.

The skilled person would realise that more than two channels 450, 460 can be provided to receive more than two stiffening elements 110, 120 if desired. Similarly, although two channels 450, 460 and two stiffening elements 110, 120 are illustrated in the figures, further alternative embodiments of the present invention can be envisaged to use a single channel 450 and corresponding single stiffening element 110. Alternatively, no channel and no stiffening element need to be provided.

Figure 5:
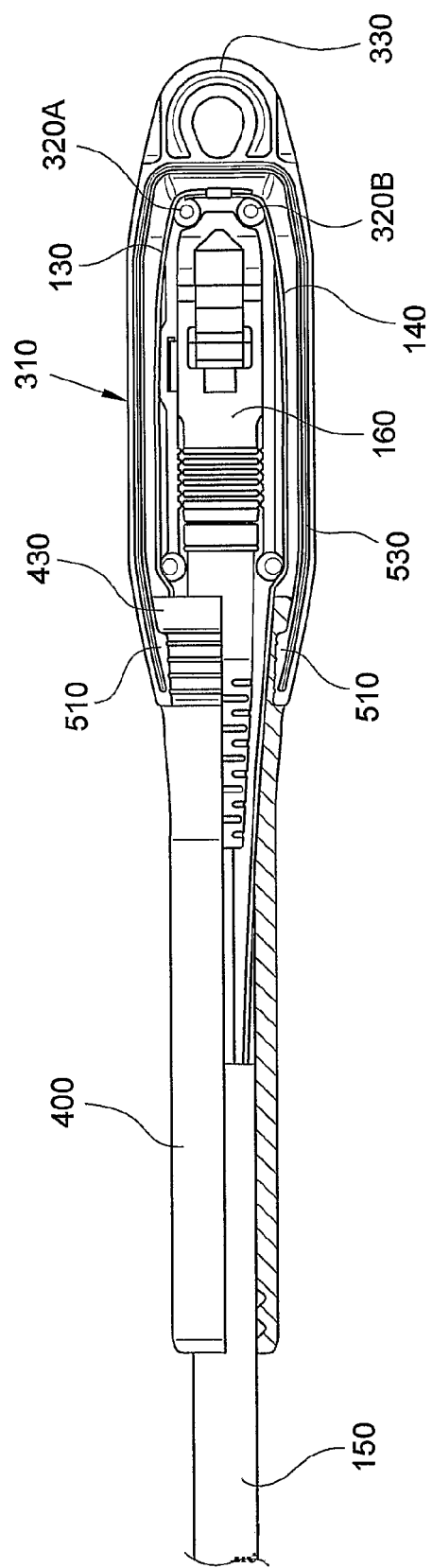
FIG. 5 illustrates a partially cross-sectional plan view of the hauling shroud.

FIG. 5 shows a partially cross-sectioned plan view of first housing member 310. First housing member 310 is illustrated with protrusion 510 that engages with boot recess 410. According to the shown preferred embodiment of the present invention, first strengthening element 130 and second strengthening element 140 are joined together to form a loop that is placed about connecting pins 320A, 320B as well as about optic connector 160. To resist separating forces whilst hauling shroud is being pulled around relatively tight bends of a conduit and to ensure seal integrity, it is possible, though not essential, to lock first housing member 310 to second housing member 910. For example, connecting pins 320A, 320B, 320C, 320D can be inserted into corresponding receptacles 920A, 920B, 920C, 920D (as shown in FIG. 9c) which are integrally formed as part of the second housing member 910. Alternatively, ultrasonic welding or a bonding adhesive can be used for improving the mutual connection of first housing member 310 to second housing member 910. Alternatively or additionally the above mentioned locking of housing members 310, 910 may occur along a lip or protruding rim 530 of first housing member 310 (shown in FIG. 5) and corresponding recess or groove 930 of second housing member 910 (shown in FIG. 9c). Alternatively, respective components of first housing member 310 and second housing member 910 might simply engage by resilient engagement of corresponding elements.

As illustrated in FIG. 5, lip 530 is an extended protrusion that is adapted to be received in recess or groove 930 of second housing member 910. Alternatively, first housing member 310 may also be provided with a corresponding recess or groove and a form of seal can be provided to be partially received by each recess or groove in first housing member 310 and second housing member 910, for example an adhesive or ring-type seal.

According to a preferred embodiment of the present invention, the boot has an external diameter of about 9.8 mm. The length of the externally exposed surface of boot 400 may be about 60 mm. The length of boot recess 410 combined with flanged head 430 may be about 10 mm. External jacket 150 of fibre optic cable 100 may extend into boot 400 for a length of about 26 mm. The annular thickness of boot 400 may be about 1.8 mm.

Figure 6:
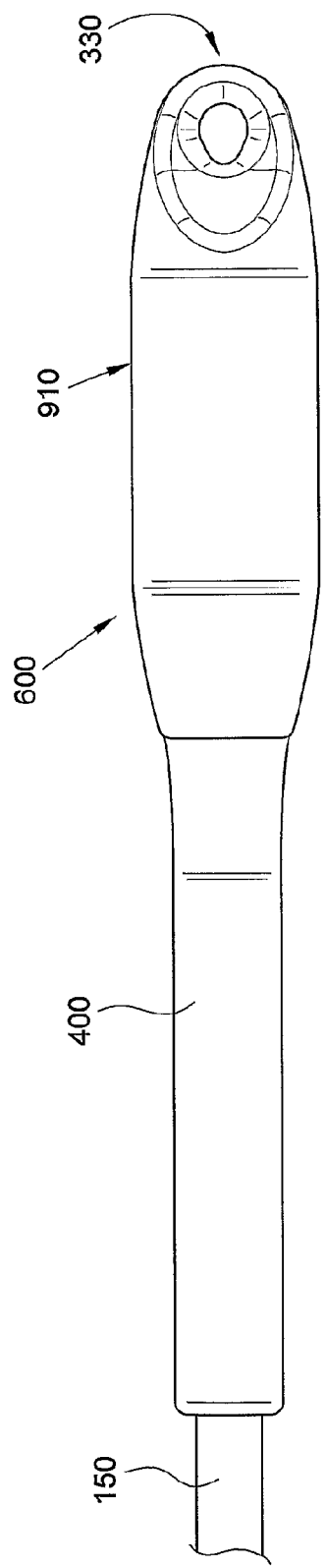
FIG. 6 illustrates an external top view of the hauling shroud.

FIG. 6 shows a top plan view of an assembled hauling shroud. According to a particular embodiment of the present invention, the total length from the exposed end of boot 400—where it joins outer jacket 150—to the end of cable attachment member 330 may be of about 120 mm. Branding, labels and/or trade marks can advantageously be provided on the external surface of first housing member 310 and/or second housing member 910.

Figure 7:
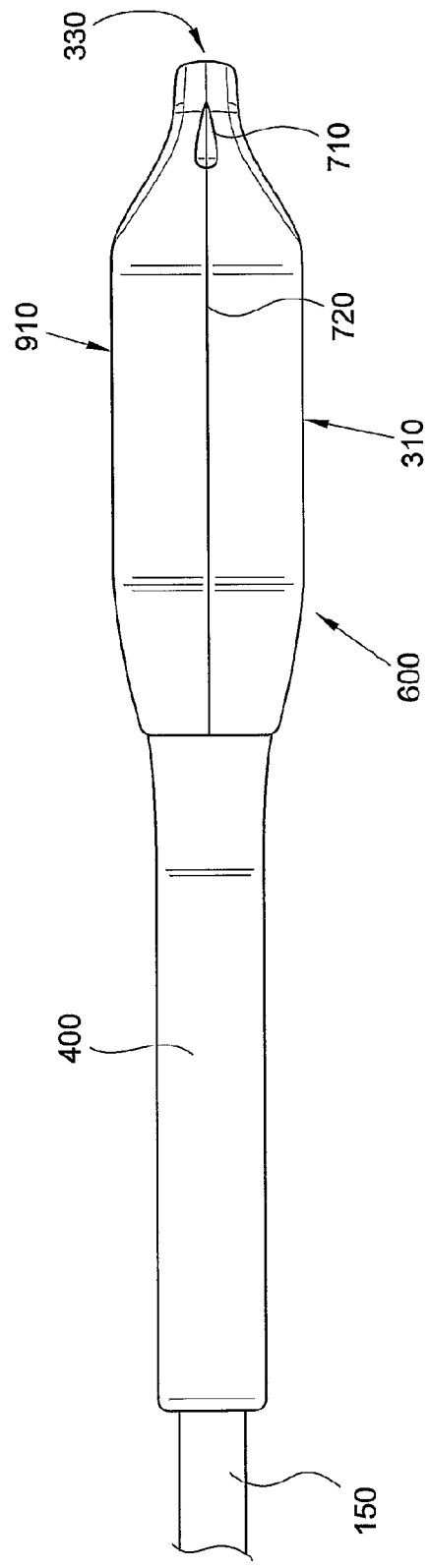
FIG. 7 illustrates an external side view of the hauling shroud.

FIG. 7 shows a side view of an assembled hauling shroud. A notch 710 is illustrated in FIG. 7 and it is formed by corresponding indents or recesses in each of first housing member 310 and second housing member 910. Notch 710 can be provided on opposing sides of the hauling shroud. Notch 710 allows a user to use a cutting tool, for example pliers, that can be forced into notch 710 to split the hauling shroud along split line 720, thereby providing access to optic connector 160. It should also be noted that, if required, first strengthening member 130 and second strengthening member 140 could also be used as rip cords so as to allow the hauling shroud to be divided into the two longitudinal shells which form the first and second housing members.

FIG. 8A shows a top plan view of first housing member 310 showing the seat for an optic termination which is not in place. Preferably, first housing member 310 is provided with a support rib 810 having the function of supporting the optic termination.

FIG. 8B shows a side cross-sectional view of first housing member 310. The support rib 810 is also illustrated. An optic termination (not shown in the figure) is made to sit on top of support rib 810.

FIG. 8C shows a perspective view of first housing member 310. First housing member 310 has a recess 820 that receives a lug which is provided on optic connector 160 to ensure correct alignment and assembly. Connecting pins 320A, 320B, 320C, 320D can be press fitted into bosses or receptacles 920A, 920B, 920C, 920D (shown in FIG. 9C) possessed by second housing member 910. Lip or flange 530 for engagement with recess or groove 930 is also clearly shown. Grasping element 330 lies outside of the sealed region or compartment provided internal to lip 530. First housing member 310 is also provided with indents or notches 830A, 830B which contribute in obtaining notch 710 (shown in FIG. 7) of the assembled hauling shroud. As previously mentioned, ultrasonic welding or adhesive bonding may be used to ensure correct sealing and mechanical integrity of the engagement between first housing member 310 and second housing member 910.

According to a specific embodiment of the present invention, the maximum external width of first housing member 310 may be about 16.9 mm. The total length of first housing member 310 may be about 60 mm. The diameter of the hole in the cable attachment member 330 may be about 4.5 mm. The width of a connecting pin, for example connecting pin 320D, may be about 3.2 mm at the tip. The sealing lip or rib 530 may extend about 1.2 mm in height. An approximate minimum thickness of the material used to form first housing member 310 may be about 1.2 mm.

FIG. 9A shows a top plan view of second housing member 910.

FIG. 9B shows a side plan view of second housing member 910.

FIG. 9C shows a bottom plan view of second housing member 910 without the optic termination in place. Preferably, second housing member 910 is provided with a support rib 940 so as to support the optic termination. Preferably, support rib 940 is integrally formed as part of second housing member 910.

FIG. 9D shows a perspective view of second housing member 910.

FIG. 9E shows a reverse perspective view of second housing member 910 without optic connector 160 in place. Second housing member 910 includes a seat 900 for receiving optic connector 160. In detail, seat 900 comprises a recess 950 for receiving a lug of optic connector 160 in order to ensure correct alignment and assembly of the optic connector within the hauling shroud. Preferably, second housing member 910 includes an arcuate protrusion 960 the shape of which corresponds to that of protrusion 510 (shown in FIG. 8C) possessed by first housing member 310. Protrusion 960 together with protrusion 510 are received in boot recess 410. Receptacles 920A, 920B, 920C, 920D (shown in FIG. 9C with only receptacle 920D visible in FIG. 9E) receive corresponding connecting pins 320A, 320B, 320C, 320D.

According to a specific embodiment of the present invention, the external width of second housing member 910 is about 16.9 mm. The total length of second housing member 910 may be about 60 mm. The length between the centre of receptacle 920B and the centre of receptacle 920D may be about 33 mm.

Figure 10:
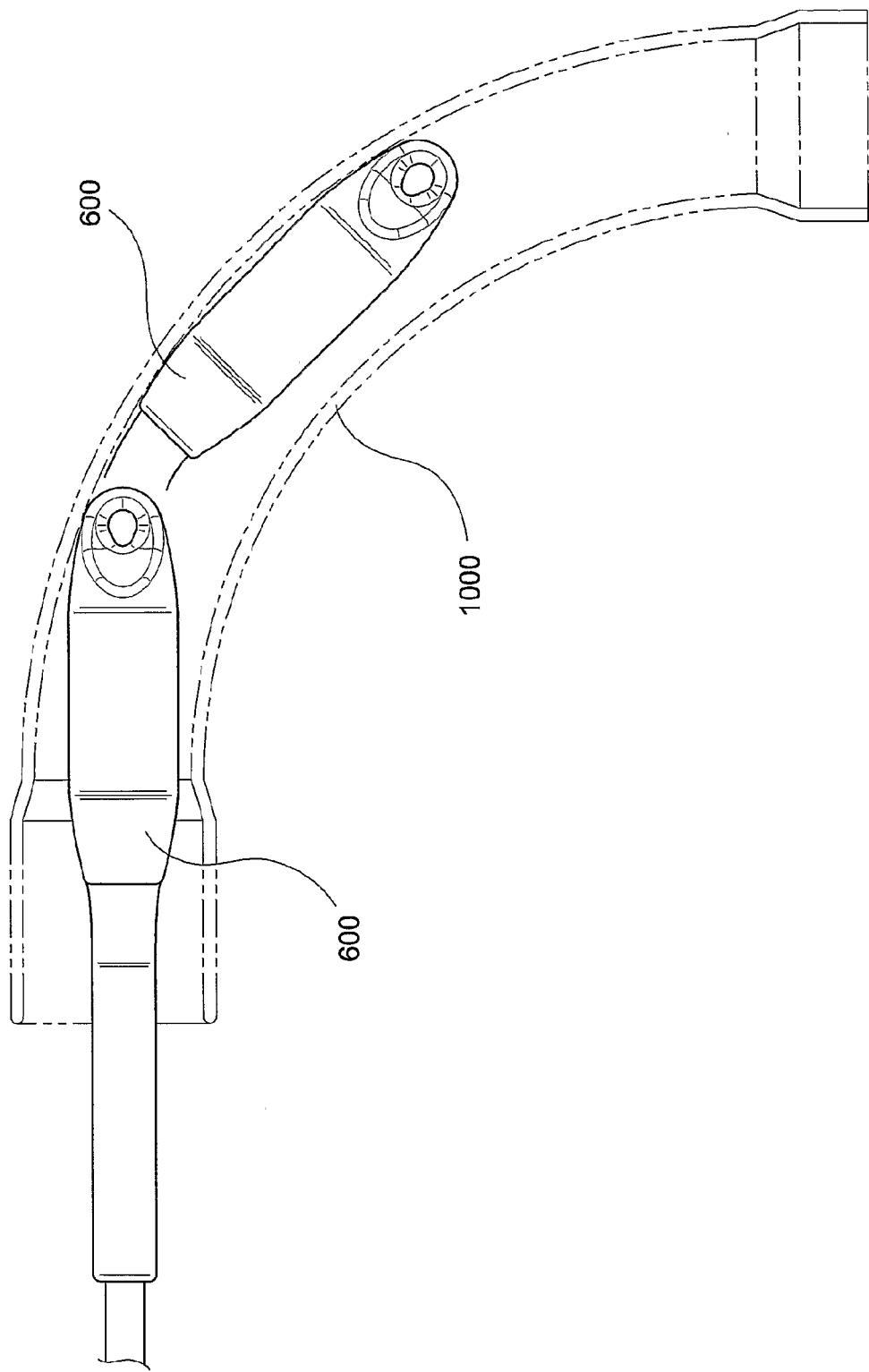
FIG. 10 illustrates the hauling shroud being pulled through a conduit.

FIG. 10 shows a bend of a conduit 1000 suitable for hauling a fibre optic cable. The hauling shroud is illustrated as being pulled through a bend in conduit 1000 and FIG. 10 shows the hauling shroud at two different moments of the hauling process, the pulling cord being not illustrated. According to the present invention, the hauling shroud is suitable for being hauled along bends having a curvature radius down to about 100 mm, principally thanks to the flexible boot 400 of the hauling shroud.

Figure 11:
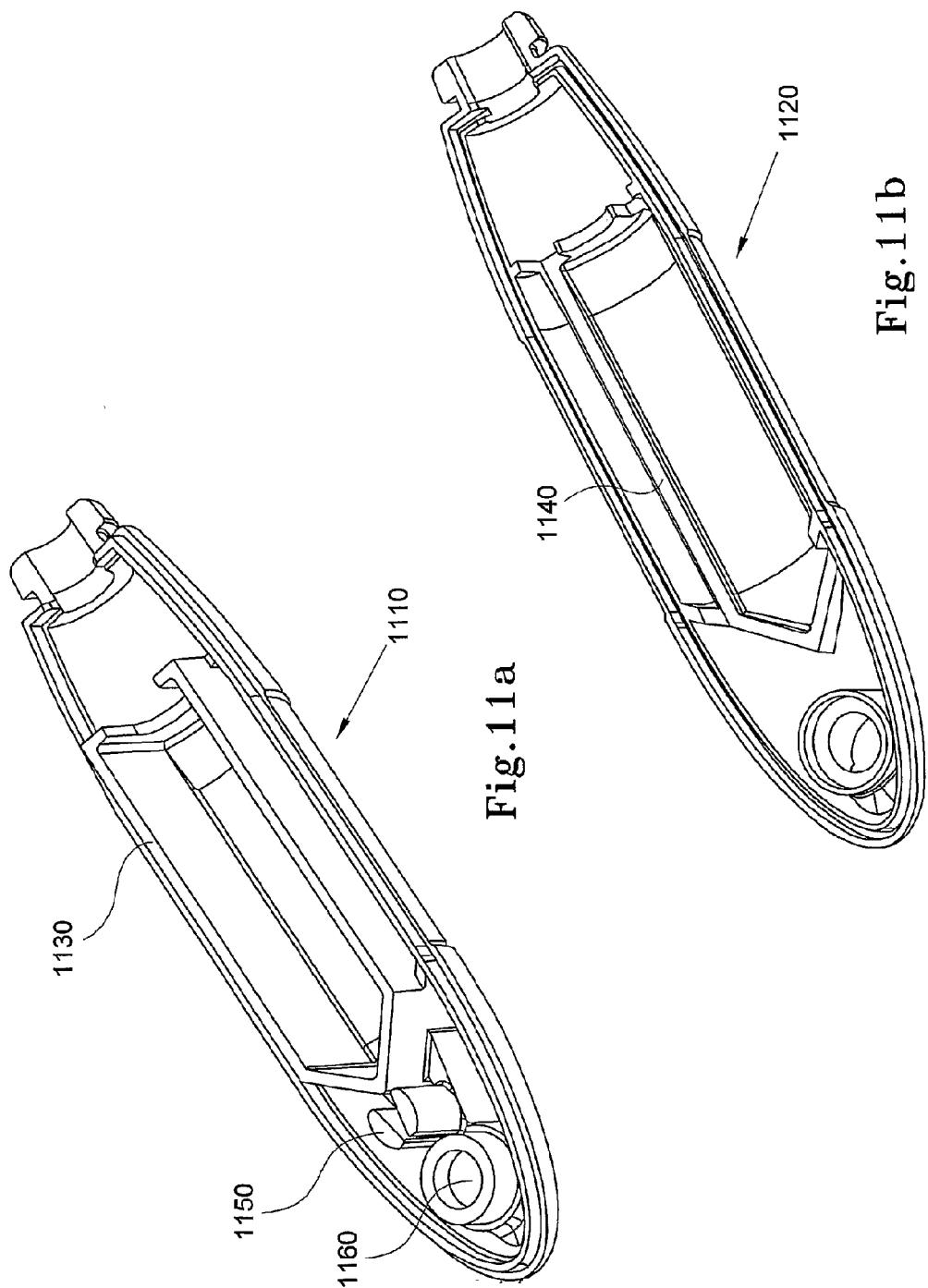
FIG. 11A illustrates, a perspective view of the first housing member according to a further embodiment of the present invention.
FIG. 11B illustrates a perspective view of the second housing member able to engage with the first housing member illustrated in FIG. 11A in accordance with a further embodiment of the present invention.

FIGS. 11A and 11B show a further embodiment of a first housing member 1110 and a second housing member 1120, respectively, of the hauling shroud of the present invention. First housing member 1110 and second housing member 1120 are assembled to form a hauling shroud in the same way as previously described with respect to the figures mentioned above. According to said further embodiment, the optic connector retaining mechanism is different from that described above. A seat 1130 is provided which is suitable for receiving an optic connector 160, not shown in the figures. The seat 1130 is preferably possessed by the first housing member 1110 and abuts a protrusion 1140 which is preferably possessed by the second housing member 1120 so that the engagement of seat 1130 with the protrusion 1140 forms a housing which encloses the optic connector 160 and keeps the latter in the correct position during hauling, storage and handling of the pre-connectorized optic cable. According to a preferred embodiment of the present invention, the at least two strengthening elements 130, 140 of fibre optic cable 100 are associated together to form a loop which engages with anchoring member 1150. According to the present embodiment, anchoring member 1150 is located along the longitudinal axis (not shown in the figures) of the housing body of the hauling shroud. According to the present embodiment, anchoring member 1150 consists of two semicircular pillars which are in close proximity to each other. Alternatively (not shown in the figures), anchoring member 1150 is a single pillar. Also illustrated is grasping element 1160 formed as a hole or bore in both first housing member 1110 and second housing member 1120.

As mentioned above, according to a preferred embodiment of the present invention (not shown in the figures), the internal cavity of the hauling shroud is provided with only one anchoring member to which is engaged at least one strengthening element of the fibre optic cable. For instance, a connecting pin can be located in front of or laterally to the seat for the optic termination and a cable strengthening element can be secured to said connecting pin, e.g. by crimping.

According to an embodiment of the present invention, the hauling shroud may be provided with an internal moisture absorbing material, for example a silica gel material, to assist with long term moisture resistance. The hauling shroud may also be hermetically sealed, and, if installed in high humidity regions, the shroud may benefit from use of such moisture absorbing material.

According to the preferred embodiment of the present invention shown in the figures, at the end of the hauling process, once the optic connector 160 has been released by removing the hauling shroud from the pre-connectorized optic cable, it is then a simple matter to plug optical connector 160 into an ONT or other optical component or network. As mentioned above, according to the present invention, no further installation work is required.

Figure 12:
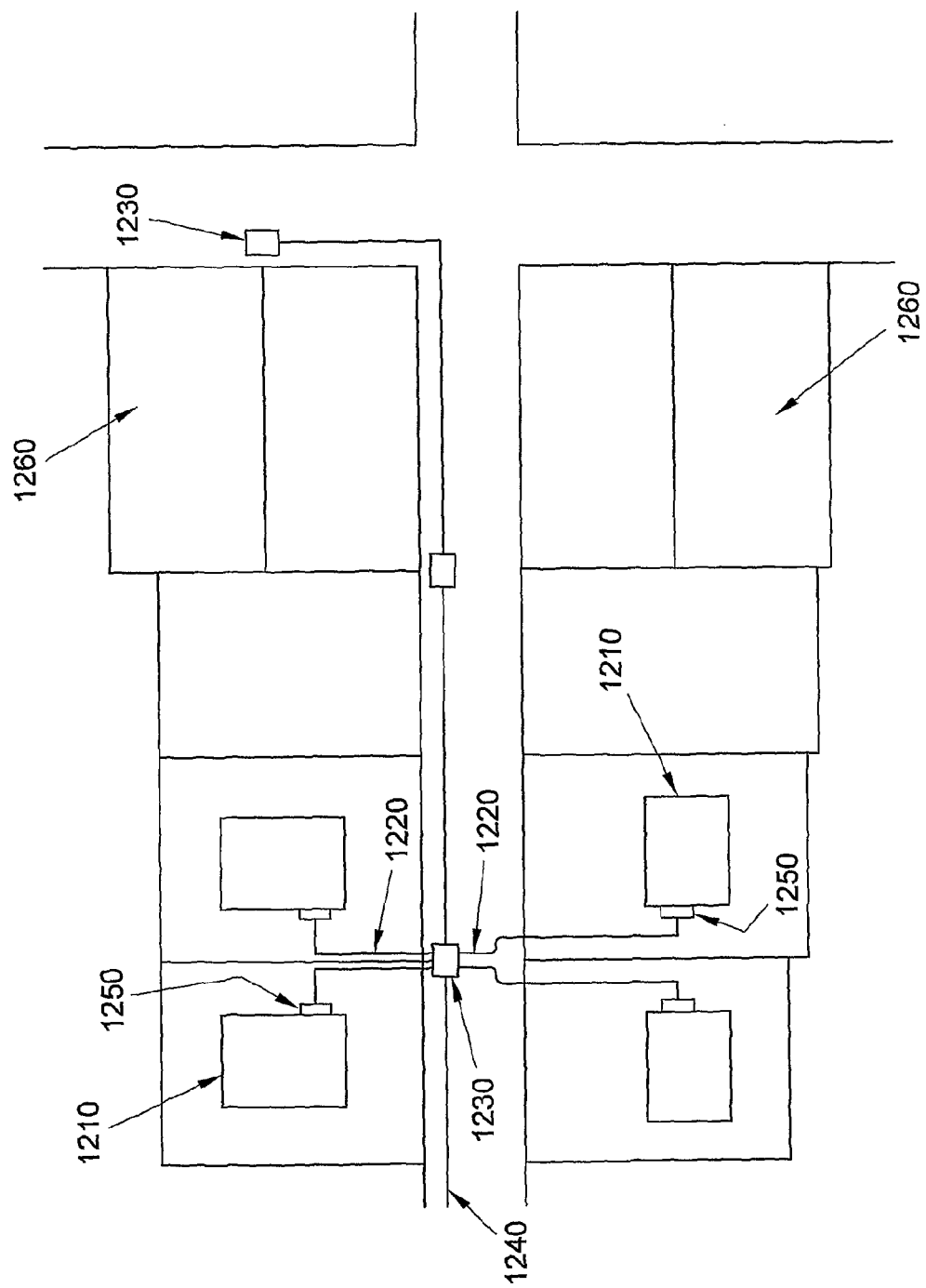
FIG. 12 illustrates an example layout of a fibre optic network in which particular embodiments of the present invention may be utilised.

FIG. 12 shows an example layout for customer connection to a PSTN. A customer dwelling 1210 has associated lead-in conduits 1220 that are typically 20 mm wide. Lead-in conduits 1220 join dwelling 1210 to distribution joint 1230 which is in an underground pit. The lead-in cables can be coiled and stored in a pit until a dwelling is established (eg. at vacant block 1260) or the actual connection is required. Distribution conduit 1240 links to the distribution joint 1230. ONT connection 1250 is typically mounted to the side of a dwelling 1210. The present invention is applicable to hauling cables through conduits in general and should not be considered to be limited to particular types of optical networks, dwellings, houses or buildings.

Various embodiments of the present invention are possible. For example, there may be provided one, two, three, or more, strengthening elements, each engaged with a separate or common anchoring member(s).

The hauling shroud is preferably designed to install a single fibre optic cable fitted with a standard SC connector, which is shown in the figures. However, the hauling shroud of the present invention is suitable for housing any kind of optic connectors, such as, for instance, FC, LC, ST, E2000 connectors. For example, a hauling shroud having an outer diameter (i.e. a radial width) of about 16.9 mm and a length of about 60 mm (total length of unit with boot being about 120 mm) can be hauled along a conduit having a circular cross-section with an internal diameter of about 20 mm or more. Preferably, the hauling shroud of the present invention permits installation of the pre-connectorized optic cable along a conduit with a bend radius of 100 mm or more. A skilled person would appreciate that other hauling shroud designs could be used for various conduit internal diameters and bend radii.

Use of the hauling shroud protects the optic termination from dust and moisture during installation into a conduit and during handling. The shroud also permits easy access to the optic termination after installation by relatively easy removal of the shroud shells. The shroud prevents or substantially impairs any load being imparted to the optic termination. The shroud also allows installation and removal after installation by operators that do not need to be highly technically trained.

According to the present invention, the shroud body is designed with a streamlined profile and shape to both contain standard optic terminations and permit installation into relatively small diameter conduits. The design of the shroud has an external streamlined profile and a flexible strain relief boot for ease of installation. The cable and shroud assembly are designed such that the load bearing strength elements are contained within the outer area of the cable structure, such that the inner cable and optic termination are decoupled from tension and applied forces. Moreover, the shroud may be easily pulled backwards in case of damage or obstruction in the duct/conduit. The shroud profile assists reverse hauling in such a situation.

In a particular embodiment of the present invention, the shroud allows for relatively quick and easy optic termination access after installation by complete shroud removal using pliers or the like to separate the two halves of the shroud by applying pressure at a specific pinch point or notch on the shroud. This separation process generally deforms the shroud halves sufficiently to prevent reuse as the shroud is preferably designed for single use only. Also, the ability to use standard tools, for example standard pliers, avoids potential safety issues which would arise if the halves were required to be separated by other means, for example forcing a screwdriver into a slot or splitting the halves with a knife whilst holding the shroud in one's hand.

The shroud is designed to accommodate a complete pre-assembled optic connector that is pre-connected to a fibre optic cable. The shroud can be used in various optic network installations, for example—but not limited to—Fibre To The Premises (FTTP) installations.

The hauling shroud of the present invention reduces installation time during optic fibre cable rollout. The reduction in installation time can be achieved by direct and immediate fitting of an optic connector at the end of a lead-in optic cable rather than requiring a fusion splicing connection which takes more time during cable preparation as well as requiring utilisation of expensive and complicated equipment at a field site. The shroud provides moisture and dust protection during the installation process as well as permitting relatively quick maintenance replacement of lead-in cables in the case of damage to existing installed optic cables. The shroud can also avoid various mechanical stresses, physical damage and other adverse environmental effects during installation, storage and handling of the cable.

The present invention can be applied to any optic cable designs. For instance, the optic cable can contain a number of different strength members which serve different primary purposes. Stiffening elements, for example stiffening elements 110, 120, may be GRP rods that provide tensile strength and longitudinal compressive resistance (to assist with long term cable stability to counter the affects of shrinkage and contraction), whilst water-swellable glass yarns offer additional tensile strength and water blocking to the cable, which GRP rods do not. In fact, generally neither of these stiffening elements are suitable to act alone as an attachment mechanism to attach the optic cable to a hauling shroud since both GRP rods and glass yarns are relatively brittle in nature and are not easy to lock-off or attach as they have a tendency to break when bent or compressed.

In a particular embodiment, additional strengthening elements 130, 140 are used in the form of aramid yarns so as to facilitate hauling shroud attachment and additionally for possible use as cable rip cords. Aramid yarns provide enough tensile strength to haul the cable and connector. A skilled person will however appreciate that a variety of other strengthening elements can be used, the latter being possibly formed from one or more different materials.

According to the present invention the strengthening elements 130, 140 are used for attachment of the hauling shroud. On the contrary, stiffening elements 110, 120 are not essential elements for the present invention, the stiffening elements being used to ensure correct operation of the optic cable and not as means for attaching the hauling shroud to the optic cable.

The strengthening elements 130, 140 are shown in the figures as being diametrically opposed to each other. Alternatively, said strengthening elements can be differently located within the cable design. According to a further embodiment of the present invention, more than two strengthening elements can be utilised together to form a single loop. Moreover, according to the present invention more than one distinct loop can be formed with each loop engaging with a common anchoring member or each loop engaging with separate anchoring members.

According to the present invention, the strengthening elements can be clamped or crimped in any position within the body of the hauling shroud. Options other than crimping or clamping exist, for example using a simple knot, glue or adhesive, screw locking system or any combination thereof. For example, strengthening elements 130, 140 may be locked to the hauling shroud using a screw fixture such as a screw that is in threaded engagement with the first housing member or the second housing member. Although not essential, providing channels in a flexible boot for receiving stiffening elements assists to minimise any rotational effects and assists to maintain the optic cable and hauling shroud in fixed relative positions during installation.

As mentioned above, the present invention provides for a hauling shroud, cable termination and method for hauling or pulling a fibre optic cable with an optic connector along a conduit, pipe or the like.

The invention claimed is:

1. A hauling shroud for hauling a fiber optical cable along a conduit, comprising: a closable housing body having an internal cavity and a grasping element for pulling the fiber optic cable along said conduit; and at least one anchoring member suitable for engaging with at least one strengthening element of the fiber optic cable, wherein: said internal cavity comprises a seat for housing an optic termination, said anchoring member is located within said internal cavity, said closable housing body is longitudinally split, and said at least one strengthening element of the fiber optic cable comprises at least two strengthening elements associated together to form a loop which engages with the at least one anchoring member provided within the internal cavity of the housing of the hauling shroud.

2. The hauling shroud as claimed in claim 1, wherein the housing body comprises a first housing member and a second housing member, the first housing member engaging with the second housing member to form said internal cavity.

3. The hauling shroud as claimed in claim 1, further comprising a securing element for engaging the at least two strengthening elements to the anchoring member.

4. The hauling shroud as claimed in claim 3, wherein the securing element is chosen from the group comprising: a clip, a crimp, a knot, an adhesive, a screw, or a combination thereof.

5. The hauling shroud as claimed in claim 1, wherein a position of the anchoring member is selected from: in front of the seat, behind the seat, and on one or more lateral sides of the seat.

6. The hauling shroud as claimed in claim 1, wherein the anchoring member is selected from: a pin, a pillar, a catch, a hook, or a combination thereof.

7. The hauling shroud as claimed in claim 2, wherein the anchoring member is at least one connecting pin integrally formed as part of the first housing member.

8. The hauling shroud as claimed in claim 7, wherein at least two connecting pins integrally formed as part of the first housing member are received into at least two receptacles integrally formed as part of the second housing member.

9. The hauling shroud as claimed in claim 1, further comprising a flexible boot positioned about the fibre optic cable.

10. The hauling shroud as claimed in claim 9, wherein the hauling shroud engages with and partially encloses the flexible boot.

11. The hauling shroud as claimed in claim 9, wherein the flexible boot comprises a recess for receiving a protrusion possessed by the hauling shroud.

12. The hauling shroud as claimed in claim 9, wherein the flexible boot comprises at least one channel for receiving at least one stiffening element of the fibre optic cable.

13. The hauling shroud as claimed in claim 1, wherein an external surface of the hauling shroud has a streamlined shape for assisting in hauling a shroud through the conduit.

14. The hauling shroud as claimed in claim 1, wherein the grasping element comprises at least one pulling eyelet suitable for engaging a pulling rope for hauling the fibre optic cable along the conduit.

15. The hauling shroud as claimed in claim 1, wherein the anchoring member is located along a longitudinal axis of the housing body.

16. The hauling shroud as claimed in claim 1, wherein the housing body comprises at least one support rib for supporting an optic connector.

17. A cable termination for hauling a fiber optic cable along a conduit, comprising: at least one optic termination connected to a fiber optic cable, and a hauling shroud for hauling the fiber optic cable along a conduit, the hauling shroud comprising a grasping element for pulling the fiber optic cable along said conduit, the closable housing body defining an internal cavity which comprises a seat for housing the optic termination and which locates at least one anchoring member suitable for engaging with at least one strengthening element of the fiber optic cable, wherein said closable housing body is longitudinally split and wherein said at least one strengthen element of the fiber optic cable comprises at least two strengthening elements associated together to form a loop which engages with the at least on anchoring member provided within the internal cavity of the housing of the hauling shroud.

18. The cable termination as claimed in claim 17, wherein the optic termination is a ferrule.

19. The cable termination as claimed in claim 17, wherein the optic termination is an optic connector.

20. The cable termination as claimed in claim 19, wherein the optic connector comprises a ferrule.

21. The cable termination as claimed in claim 20, wherein the optic connector comprises a retaining member for housing said ferrule.

22. The cable termination as claimed in claim 17, wherein the housing body comprises a first housing member and a second housing member, the first housing member engaging the second housing member to form said internal cavity.

23. The cable termination as claimed in claim 17, wherein the at least one optic termination is aligned with at least one optic fibre of said fibre optic cable.

24. The cable termination as claimed in claim 17, further comprising a securing element for coupling the at least two strengthening elements together so as to obtain said loop.

25. The cable termination as claimed in claim 24, wherein the securing element is chosen from the group comprising: a clip, a crimp, a knot, an adhesive, a screw, or a combination thereof.

26. The cable termination as claimed in claim 17, wherein the at least one strengthening element comprises polymer fibres.

27. The cable termination as claimed in claim 26, wherein the at least one strengthening element is made of aramid yarns.

28. A method of hauling a pre-connectorized fibre optic cable along a conduit, comprising the steps of:
providing a fibre optic cable with at least one optic termination;
positioning the optic termination into a seat formed within a housing body of a hauling shroud; and
securing at least one strengthening element of the fibre optic cable within the housing body by coupling together at least two strengthening elements of the fibre optic cable so as to form a loop and engaging said loop with at least one anchoring member provided within an internal cavity of the housing body of the hauling shroud.

29. The method as claimed in claim 28, wherein the step of engaging comprises crimping the at least two strengthening elements to the at least one anchoring member.

30. The method as claimed in claim 28, wherein the step of engaging comprises bonding the at least two strengthening elements to the at least one anchoring member.

31. The method as claimed in claim 28, wherein the step of engaging comprises knotting the at least two strengthening elements to the at least one anchoring member.

32. The method as claimed in claim 28, wherein the step of engaging comprises screwing the at least two strengthening elements to the at least one anchoring member.

33. The method as claimed in claim 28, further comprising the step of connecting the optic termination to at least one optic fibre of the fibre optic cable.

34. The method as claimed in claim 28, wherein the step of coupling comprises clipping together the at least two strengthening elements.

35. The method as claimed in claim 28, wherein the step of coupling comprises crimping together the at least two strengthening elements.

36. The method as claimed in claim 28, wherein the step of coupling comprises bonding together the at least two strengthening elements.

37. The method as claimed in claim 28, wherein the step of coupling comprises knotting together the at least two strengthening elements.

38. The method as claimed in claim 28, wherein the step of coupling comprises screwing together the at least two strengthening elements.

39. The method as claimed in claim 28, further comprising the step of mating a first housing member and a second housing member of said housing body so as to form the hauling shroud and to enclose thereinto the optic termination.

40. The method as claimed in claim 39, wherein the step of mating comprises associating at least part of the first housing member to at least part of the second housing member by resilient engagement, ultrasonic welding or adhesive bonding.

41. The method as claimed in claim 28, further comprising the step of applying a pulling force to a grasping element of the hauling shroud for hauling the fibre optic cable along the conduit.

42. The method as claimed in claim 28, wherein the step of coupling comprises clipping, crimping, bonding, knotting or screwing together the at least two strengthening elements.

* * * * *